United States Patent [19]

King

[11] Patent Number: 5,164,755
[45] Date of Patent: Nov. 17, 1992

[54] CAMERA ACCESSORY FOR MACROPHOTOGRAPHY HAVING TRANSLUCENT BELLOWS

[75] Inventor: Jack N. King, Davidson, N.C.

[73] Assignee: Camera World, Inc., Charlotte, N.C.

[21] Appl. No.: 784,246

[22] Filed: Oct. 29, 1991

[51] Int. Cl.⁵ .................. G03B 11/00; G03B 17/04; G03B 11/04
[52] U.S. Cl. ............................. 354/295; 354/187; 354/287
[58] Field of Search ............... 354/120, 122, 187, 287, 354/295, 296

[56] References Cited

U.S. PATENT DOCUMENTS

| | | | |
|---|---|---|---|
| 2,612,824 | 10/1952 | Kroemmelbein, Jr. | 354/287 |
| 4,030,114 | 6/1977 | Telfer | 354/295 |
| 4,053,910 | 10/1977 | Bodnar | 354/295 X |
| 4,381,890 | 5/1983 | Wallace | 354/295 X |
| 4,484,805 | 11/1984 | Gizzio | 354/295 X |
| 4,547,053 | 10/1985 | Tobler | 354/295 X |
| 4,708,449 | 11/1987 | Thomas | 354/295 X |
| 4,752,798 | 6/1988 | Chrosziel | 354/287 |
| 4,875,066 | 10/1989 | Rickard | 354/296 |

FOREIGN PATENT DOCUMENTS 1-50677  2/1989  Japan .
1-201888 8/1989  Japan .

Primary Examiner—Michael L. Gellner
Assistant Examiner—J. K. Han
Attorney, Agent, or Firm—Bell, Seltzer, Park & Gibson

[57] ABSTRACT

A camera accessory for adapting a camera for macro photography including an adaptor for attaching the accessory to the lens of the camera, an adjustable bellows formed of translucent material for admitting diffused lights to all sides of the subject, and an extension bellows also formed of translucent material for larger subjects or subjects to be photographed at a greater distance from the lens.

10 Claims, 3 Drawing Sheets

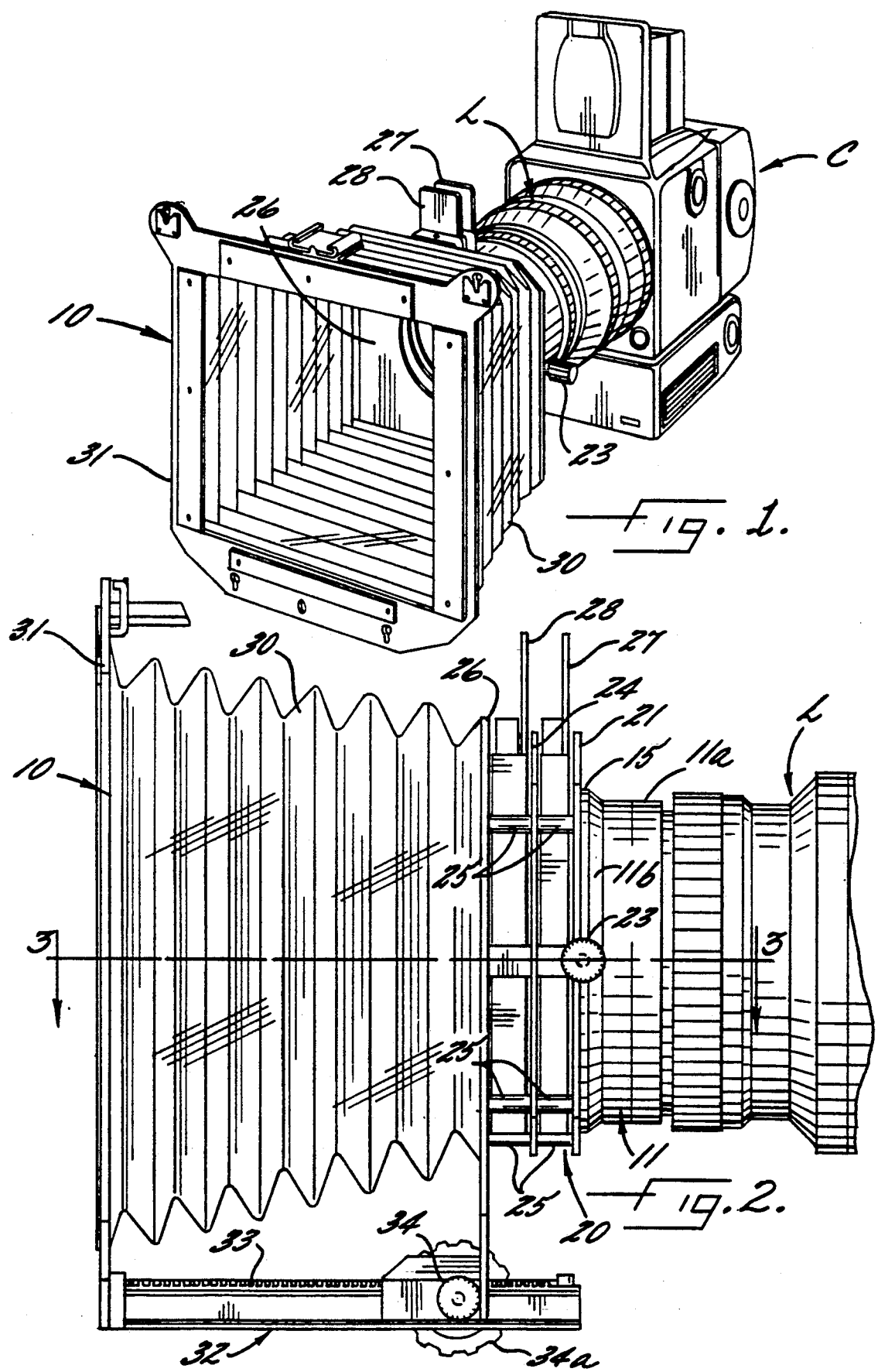

CAMERA ACCESSORY FOR MACROPHOTOGRAPHY HAVING TRANSLUCENT BELLOWS

FIELD AND BACKGROUND OF THE INVENTION

The present invention relates to photographic equipment and more particularly to an accessory for adapting a camera for macrophotography.

Macrophotography is close-up photography, usually of relatively small objects, scientific or medical specimens and the like. Optimum lighting conditions for proper macrophotography include soft, diffused lighting which has been heretofore difficult to achieve.

Previously it has been believed that macrophotography could be performed only with special lighting techniques and equipment, such as portable light tents or the like. Such special lighting is expensive, cumbersome and difficult to arrange and control. Accordingly, macrophotography has been heretofore difficult, expensive and, for the most part, only the province of the expert.

SUMMARY OF THE INVENTION

With the foregoing in mind, it is an object of the present invention to provide an accessory for adapting a camera for macrophotography which produces optimum lighting conditions in daylight or with conventional photographic light sources without the deficiencies, disadvantages and difficulties heretofore encountered.

The foregoing object is accomplished by providing a camera accessory for adapting a camera for macrophotography which includes an adaptor for connecting the accessory to the lens of a camera and a translucent bellows connected to and extending outwardly from the adaptor for a predetermined distance. The translucent bellows admits soft, diffused light to all sides of the subject from non-special lighting, such as daylight or commonly available strobe lights.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate preferred and exemplary embodiments, and wherein:

FIG. 1 is a perspective view of a camera having the accessory of the present invention mounted thereon FIG. 2 is an enlarged, fragmentary side elevation of the camera and accessory shown in FIG. 1;

DESCRIPTION OF THE PREFERRED EMBODIMENTS

Figure 3:
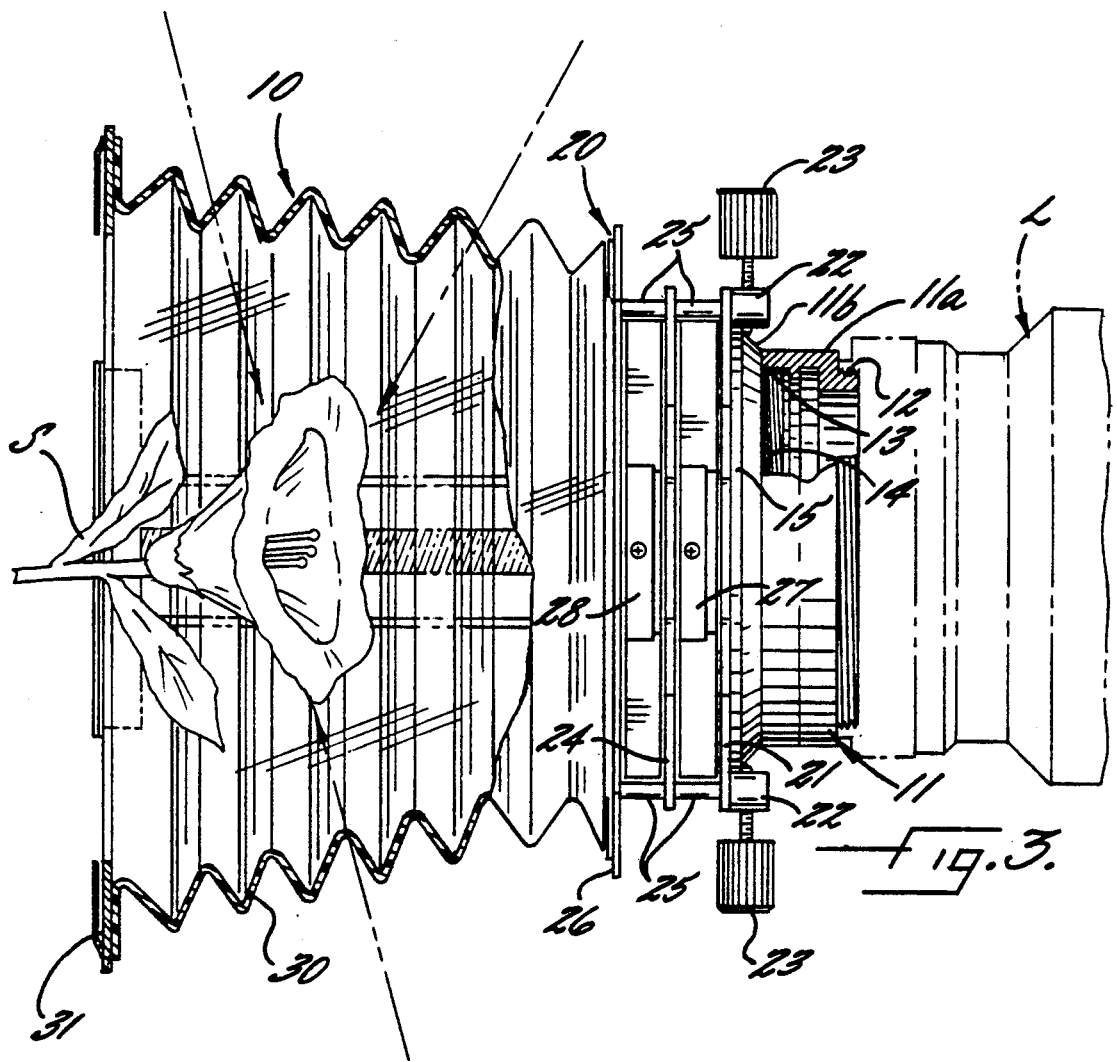
FIG. 3 is a sectional view of the accessory taken substantially along line 3—3 in FIG. 2 and also illustrating the manner of use of the accessory for macrophotography.

Referring now more particularly to the drawings, a conventional camera C, capable of macrophotography, having a lens L on the front thereof is shown. A first embodiment of the accessory of the present invention is generally indicated at 10 in FIGS. 1-3 and includes an adaptor ring 11 (FIGS. 2 and 3) for mounting accessory 10 on the outer end of the lens L of camera C. The outer end of the lens L has internally facing threads thereon and adaptor ring 11 has external, mating threads so that the adaptor ring 11 may be screwed into the outer end of the lens L.

Adaptor ring 11 may be unitary, but is illustrated as comprising first and second ring portions 11a and 11b. Ring portion 11a has external threads 12 on one end portion and internal threads 13 on the other end portion. Ring portion 11b has external threads 14 on one end portion thereof for mating engagement with threads 13 on ring portion 11a and a flange portion 15 on the other end thereof.

Accessory 10 further includes a first frame member 20 adapted to be removably mounted on adaptor ring 11. First frame member 20 has a central aperture or opening therethrough to admit light therethrough to the lens L of camera C. First frame member 20 includes a first plate member 21 having a round, centrally located opening or aperture therein of a size corresponding to the size of the opening in the outer end of adaptor ring 11. First plate member 21 has a plurality of bosses 22 mounted thereon, preferably at each of the two opposite sides of plate member 21. Attachment screws 23 are threadably mounted in bosses 22 for attaching first plate member 21 to the outer flange 15 of adaptor ring 11 (FIG. 3).

First frame member 20 also includes a second plate member 24 spaced outwardly from first plate member 21 a predetermined distance and connected thereto by a plurality of pins 25. Second plate member 24 has a round, centrally located opening or aperture therein that is slightly larger than the opening or aperture in first plate member 21.

First frame member 20 has a third plate member 26 spaced outwardly from second plate member 24 and connected to second plate member 24 and first plate member 21 by pins 25. Third plate member 26 also has a round, centrally located opening or aperture therein that is correspondingly larger than the opening or aperture in second plate member 24. The spaces between first plate member 21 and second plate member 24 and between second plate member 24 and third plate member 26 comprises mounting slots or holders for filter or auxiliary lens holders 27,28.

Accessory 10 further comprises an elongate bellows member 30 which is generally rectangular, preferably square, in transverse cross-section and being hollow or of tubular construction. The inner end of bellows member 30 is mounted on third plate member 26 as by a suitable adhesive or rivets. The outer end of bellows member 30 is mounted on a second frame member 31, also as by a suitable adhesive or rivets.

Bellows member 30 is constructed of a translucent material which admits diffused light therethrough sufficient for macrophotography of scientific, medical or other subjects, such as coins, stamps, jewelry, flowers or gross medical specimens. Preferably, the translucent material forming bellows member 30 is a polypropylene non-woven material of 0.2 mm thickness. One form of this material is made by Sheedom Co., Ltd. of Tokyo, Japan. This material transmits light therethrough as measured by a transmission densitometer from a lighted 2 mm aperture over an approximate ½ to 2-f/stop range within the range of 0.42 to 0.53.

Preferably, second frame member 31 is connected to first frame member 20 by an adjustment means 32 for adjusting the effective length of bellows member 30. Adjustment means 32 preferably comprises a rack member 33 rigidly connected to second frame member 31 and a pinion member 34 rigidly connected to first frame member 20. An adjustment knob 34a rotates pinion member 34 to move second frame member 31 toward or away from first frame member 20 to vary the effective length of bellows member 30 for reasons well known to photographers.

Figure 4:
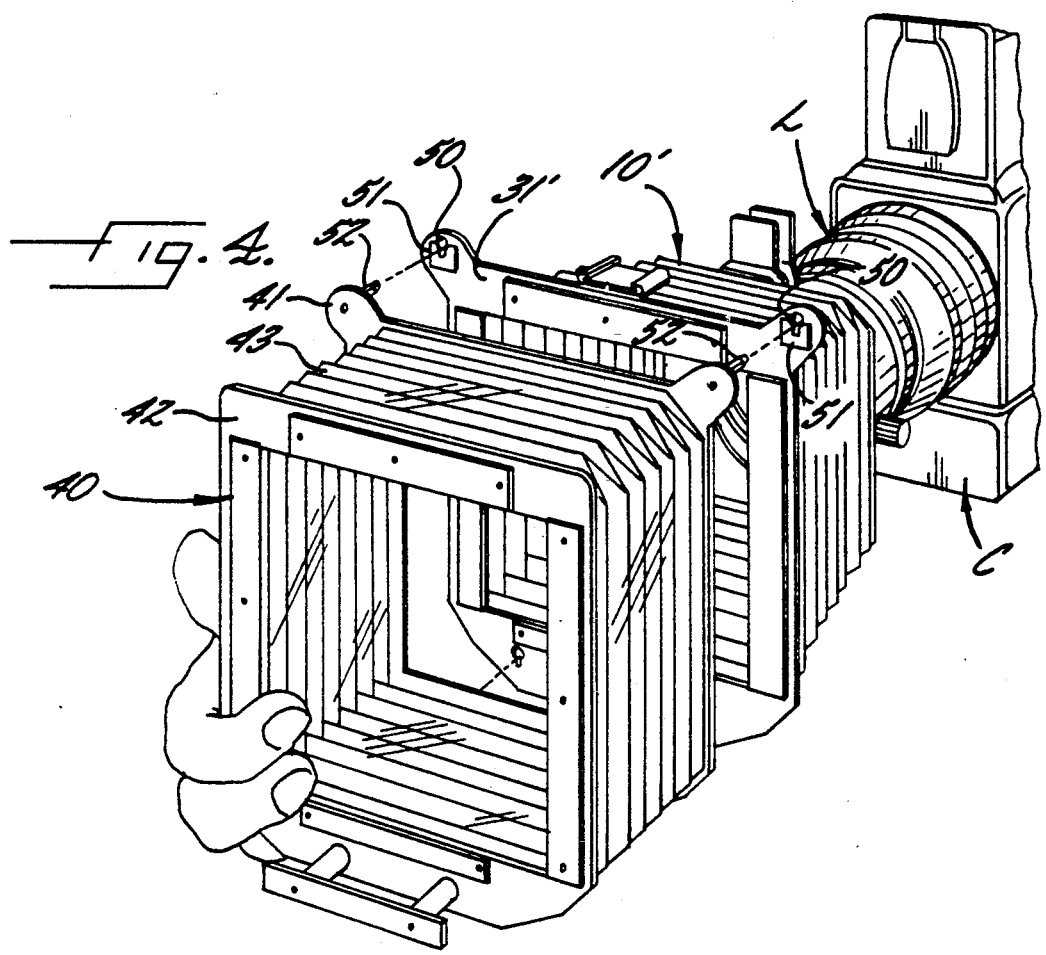
FIG. 4 is a fragmentary perspective view similar to FIG. 1 of another embodiment of the present invention in which the accessory includes an extension to increase the length thereof from the camera lens.
Figure 5:
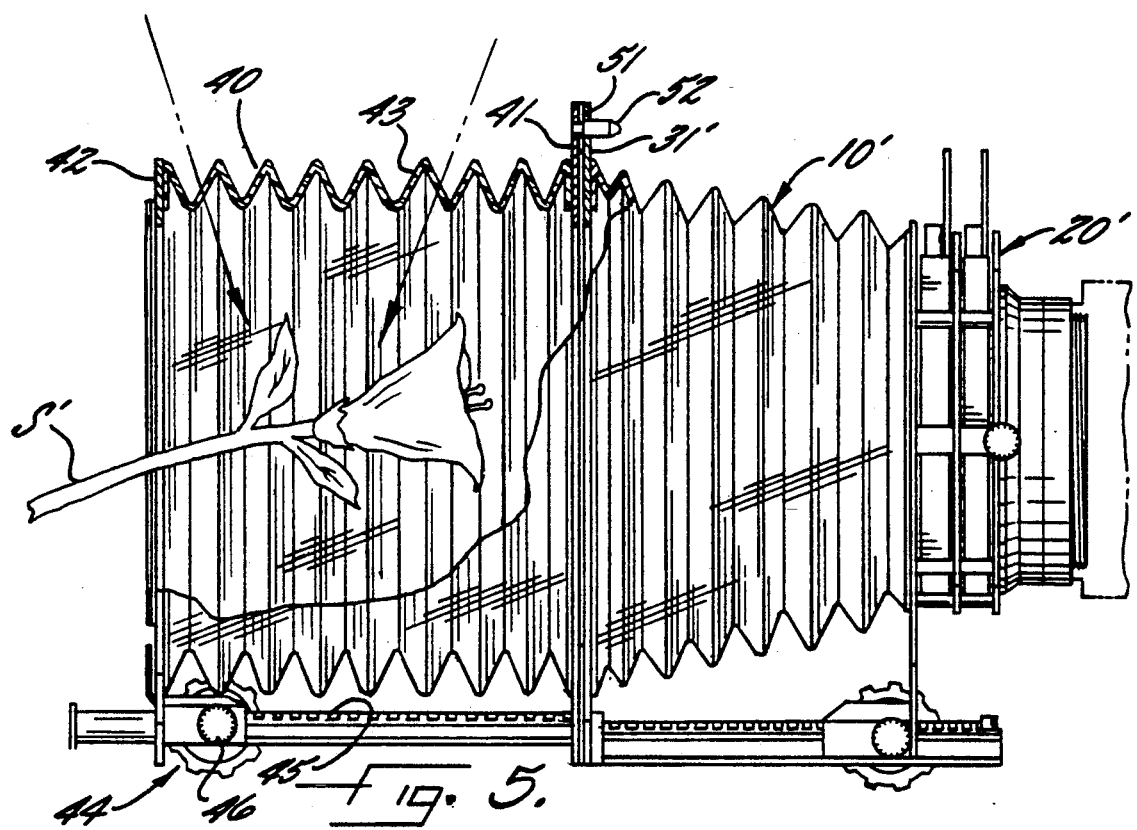
FIG. 5 is a side elevation, partially in section, of the embodiment shown in FIG. 4 and illustrating the manner of use of the accessory.

Referring now to FIGS. 4 and 5, there is illustrated another embodiment of the present invention. In this embodiment, accessory 10' is preferably constructed the same as accessory 10 described above. An accessory extension 40 is provided for photographing subjects in those instances where the subject to be photographed needs to be positioned further from the lens L than the maximum effective length of bellows member 30.

Accessory extension 40 comprises third and fourth spaced apart frame members 41 and 42 and a bellows member 43 extending therebetween. Bellows member 43 is also translucent and has the same diffused light transmitting properties as bellows member 30 described above.

Third and fourth frame members 41 and 42 have an adjustment means 44 connected thereto for varying the effective length of bellows member 43. Adjustment means 44 is illustrated as a rack 45 rigidly connected to third frame member 41 and a pinion 46 rigidly carried by fourth frame member 42.

Connecting means is provided for connecting the second frame member 31' of accessory 10' to the third frame member 41 of accessory extension 40. This connecting means comprises a plurality of holes 50 in second frame member 31' with associated spring clips 51 and a plurality of pins 52 carried by third frame member 41 (FIG. 4).

In use, accessory 10 is mounted on a camera C and appropriate filters 27,28 for color correction or close-up diopters or both are positioned in the spaces therefor. A subject S is positioned within accessory 10 and the adjustment means 32 is operated to vary the effective length of bellows member 30 to position the subject at the desired distance from the lens L.

Accessory 10 may be used with daylight only or with strobe lights (not shown) shot through the bellows member 30. The translucency of bellows member 30 produces velvet-soft, wrap-around lighting for superior macrophotography.

If a longer focal length lens is used requiring that the subject be more distance from the lens L, an accessory extension 40 may be snapped onto accessory 10' and used in the same manner as described above.

In the drawings and specification, there have been disclosed typical preferred embodiments of the invention. Although specific terms have been employed, they have been used in a generic and descriptive sense only, the scope of the invention being set forth in the following claims.

That which is claimed is:

1. A camera accessory for adapting a camera for macrophotography characterized by improved quality and clarity, said accessory comprising
    adaptor means for connecting said accessory to an outer end of a lens of a camera,
    a first frame member mounting said adaptor means and having an open medial portion for light to pass therethrough,
    a second frame member spaced from said first member and having an open medial portion in alignment with the open medial portion of said first frame member, and
    a tubular member extending between and connected to said first and second frame members, at least a portion of said tubular member being translucent to admit light into said accessory through said tubular member to improve the quality and clarity of macro photographs taken by the camera.

2. A camera accessory according to claim 1 wherein said tubular member is pleated into accordion-type folds.

3. A camera accessory according to claim 1 wherein said second frame member is movable toward and away from said first frame member to vary the effective length of said accessory with respect to the lens of the camera.

4. A camera accessory according to claim 1 wherein said second frame member is movable toward and away from said first frame member and wherein said tubular member is pleated into accordion-type folds to vary the effective length of said accessory with respect to the lens of the camera.

5. A camera accessory according to claim 4 including means connected to said first and second frame members for moving said second frame member toward and away from said first frame member.

6. A camera accessory according to claim 1 including an accessory extension connected to and extending outwardly from said second frame member and including a translucent tubular member.

7. A camera accessory for adapting a camera for macrophotography characterized by improved quality and clarity, said accessory comprising
    a first frame member having an open medial portion,
    adaptor means carried by said first frame member for mounting said first frame member on an outer end of a lens of a camera with the lens in light receiving communication with the open medial portion of said first frame member,
    a second frame member having an open medial portion and being spaced from said first frame member with the open medial portion thereof in alignment with the open medial portion of said first frame member,
    means connected to said first and second frame members for moving said second frame member toward and away from said first frame member to vary the effective length of said accessory with respect to the lens of the camera, and
    a tubular bellows member connected at its opposite ends to said first and second frame members and defining an enclosed space therebetween, said bellows member being formed of translucent material to admit diffused light into said enclosed space through said bellows member to improve the quality and clarity of macrophotographs taken by the camera.

8. A camera accessory according to claim 7 wherein said first frame member includes means for receipt of filters, auxiliary lens or other camera accessories.

9. A camera accessory according to claim 7 including an accessory extension removably mounted on said second frame member and including a tubular bellows member formed of translucent material.

10. A camera accessory according to claim 9 wherein said accessory extension includes means for adjusting the effective length of said tubular bellows member.

* * * * *